B. F. Davis.

Sharpening Mach.

N° 87,150.        Patented Feb. 23, 1869.

Witnesses              Inventor
Jno. G. Patton        Benj'n F. Davis
Edmund Mason      By Atty A. B. Stoughton

UNITED STATES PATENT OFFICE.

BENJAMIN F. DAVIS, OF AUBURN, NEW YORK.

*Letters Patent No. 87,150, dated February 23, 1869.*

IMPROVEMENT IN MACHINE FOR GRINDING THE KNIVES OF MOWING-MACHINES.

*The Schedule referred to in these Letters Patent and making part of the same.*

*To all whom it may concern:*

Be it known that I, BENJAMIN F. DAVIS, of Auburn, in the county of Cayuga, and State of New York, have invented certain new and useful Improvements in Machines for Grinding the Knives of Mowing Machines; and I do hereby declare the following to be a full, clear, and exact description of the same, reference being had to the accompanying drawings, making a part of this specification, in which—

Similar letters of reference, where they occur in the separate figures, denote like parts of the machine in both of the drawings.

Figure 1:
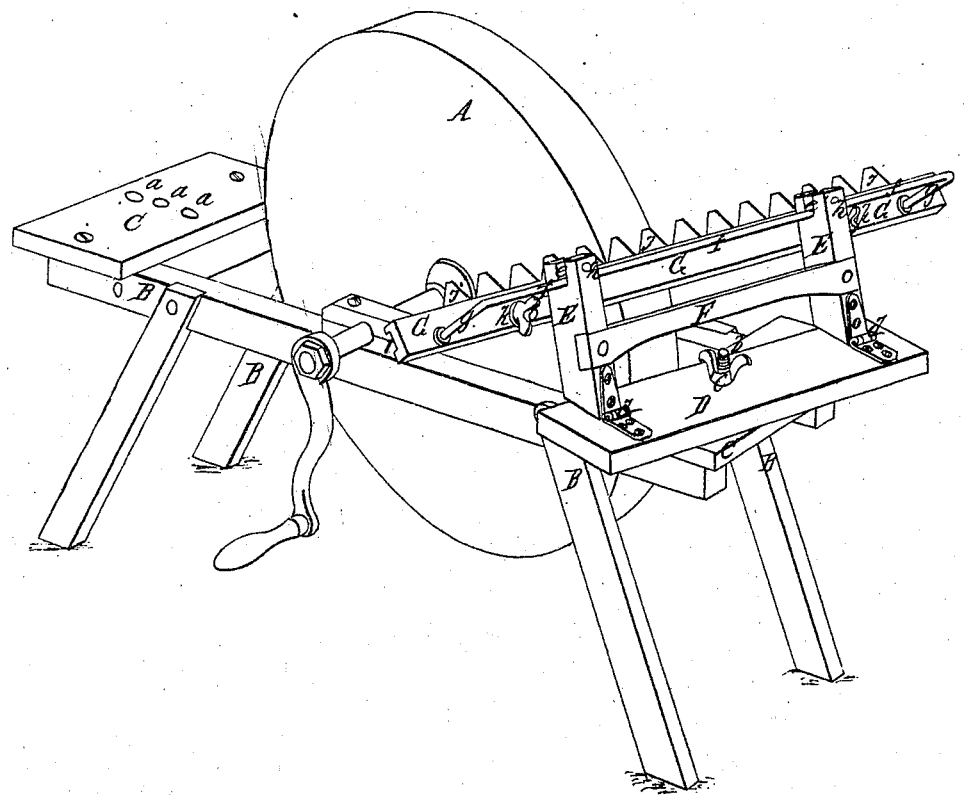
Figure 1 represents a perspective view of the entire machine, with a sickle-bar in place, ready to be ground.
Figure 2:
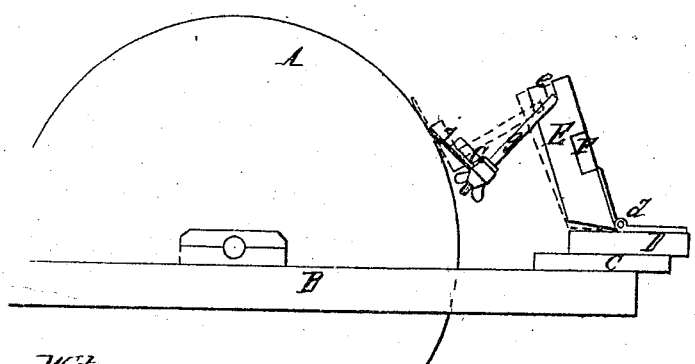
Figure 2 represents a broken side elevation, to show the mode of applying the sickles, or sections to the stone.

Many forms of these sickle-section grinding-machines have been made and patented, but much remains to be done to make them cheap, portable, and efficient, and to accomplish, in a perfect manner, the object and purpose for which they are designed.

My invention has for its object the more ready bringing up of the edges to be ground, to the face of the stone, and the afterward moving of the edge to be ground, on the face of the stone, but in a true plane, by which means the grinding is more rapid, and the face of the stone prevented from glazing.

To enable others skilled in the art to make and use my invention, I will proceed to describe the same with reference to the drawings.

A represents a grindstone, hung on a frame, B, of the usual well-known kind.

Upon either or both of the ends of the frame there is a bench, C, furnished with a series of holes, *a a*, in or to which the base D, of the clamping and swinging frame is attached by the set-screw *b* and thumb-nut *c*, after said frame has been so adjusted as to bring the sickle-sections to the grindstone at the angle necessary to grind the desired bevel to the edges thereof.

To the base D are hinged, by hinges *d d*, the arms E E, which incline toward the stone, but can be swung back from the stone, or to it, until its ends are fairly seated on the base D.

These arms are united by a tie, F, so as to constitute a swing-frame.

Notches, or gains, *e e*, are formed in the tops of the arms E E, into which a round bar, *f*, having its ends, *g*, turned at right angles to the line of its length, lies, and can roll or turn, said bar being held from leaving the notches by pins *h h* passing over them.

The bent ends *g*, of the rod, or bar *f*, are fastened to the clamping-bar G, in a recess, *i*, in the face of which the sickle lies, the sections *j* extending above the top of said bar G.

When the sickle is placed in the recess of the bar G, it is clamped thereto by hook-headed clamps, and thumb-nuts, *k*, to draw them up tightly against the sickle.

In grinding, the clamping-bar and sickle are moved along by sliding the rod *f* through the slots *e*, until one of the bent portions, *g*, comes against one of the arms E, then the sickle must be shifted in the clamping-bar, and the bar can again be shifted along to bring the sections, in succession, to the stone.

It would be possible, of course, to make the rod and the clamping-bar long enough to grind a whole sickle without shifting it in the bar, but there would be no economy in so doing, as everything would have to be heavier and stronger, or else shackling.

By this mode of arranging the parts, I attain four very desirable movements, which have never before been combined in one machine, viz, first, the oblique adjustment of the sickle to the stone; second, the swinging of the sickle to and from the stone; third, the moving of the sections up and down on the face of the stone; and fourth, the moving of the section and clamping-bar laterally on or in the swing-frame, to bring the sections successively to the stone.

Three of these movements may have been attained on one and the same machine, but not the four; and it is the construction and arrangement by which these four movements are attained, that constitute my invention.

The object of the third motion, hereinabove mentioned, is to expedite the grinding, by moving the section up and down against the stone, which, besides, prevents the face of the stone from glazing.

Having thus fully described my invention,

What I claim therein as new, and desire to secure by Letters Patent, is—

In combination with the swinging frame E, the bent rod *g*, for holding and affording two motions to the clamp and cutter being ground, viz, an up and down, and a longitudinal motion past the stone, substantially as described.

B. F. DAVIS.

Witnesses:
A. B. STOUGHTON,
EDMUND MASSON.